United States Patent [19]
Yamada et al.

[11] Patent Number: 5,594,049
[45] Date of Patent: Jan. 14, 1997

[54] CATIONIC ELECTRODEPOSITION COATING COMPOSITION

[75] Inventors: Mitsuo Yamada, Suita; Yusaku Kobata, Higashiosaka, both of Japan

[73] Assignee: Nippon Paint Co., Ltd., Osaka, Japan

[21] Appl. No.: 474,677

[22] Filed: Jun. 7, 1995

Related U.S. Application Data

[62] Division of Ser. No. 392,170, Feb. 22, 1995, abandoned.

[30] Foreign Application Priority Data

Feb. 22, 1994 [JP] Japan .................................. 6-49806

[51] Int. Cl.$^6$ .............................. C08K 3/20; C08L 63/02
[52] U.S. Cl. .......................... 523/415; 204/504; 204/505; 523/420
[58] Field of Search .................... 523/415, 420; 204/504, 505

[56] References Cited

U.S. PATENT DOCUMENTS

| | | | |
|---|---|---|---|
| 3,996,223 | 12/1976 | Gupta et al. | 544/193 |
| 4,293,669 | 10/1981 | Rottmaier et al. | 525/452 |
| 5,276,072 | 1/1994 | Ishii et al. | 523/415 |

Primary Examiner—Melvyn I. Marquis
Assistant Examiner—D. Aylward
Attorney, Agent, or Firm—Townsend & Banta

[57] ABSTRACT

The electrodeposition coating composition contains a base resin and a curing agent. The curing agent comprises a compound containing an aromatic isocyanurate ring and 3 or more blocked isocyanate groups wherein at least one of said blocked isocyanate groups is blocked with glycol ether.

8 Claims, No Drawings

CATIONIC ELECTRODEPOSITION COATING COMPOSITION

CROSS REFERENCE TO A RELATED APPLICATION

This is a divisional application of application Ser. No. 08/392,170 filed Feb. 22, 1995, abandoned.

BACKGROUND OF THE INVENTION

1. Field of the Invention

This invention relates to a curing agent and a coating composition, more specifically to a curing agent containing an isocyanurate ring and a cationic electrodeposition coating composition which contains it.

2. The Prior Art

A curing agent normally used in a cationic electrodeposition paint is a multifunctional blocked isocyanate compound. This type of multifunctional blocked isocyanate compound is generally obtained by reacting a half-blocked diisocyanate compound with a polyhydric alcohol compound.

When a cationic electrodeposition paint which contains such a curing agent is placed in an overbaking condition at 200° C. or higher, the urethane bonding of the curing agent redissociates and the obtained diisocyanate compound is apt to volatilize, leading to an increase in heating loss. Such heating loss is believed to be a possible cause of a decrease in film thickness and coloring on the topcoating film.

A multifunctional blocked isocyanate compound containing an isocyanurate ring which is a trimer of isocyanate has been considered as a curing agent which does not easily cause heating loss.

For example, Japanese unexamined patent publication Tokkai Hei 1-266172 and Tokkai Hei 2-11669 disclosed a curing agent comprising a multifunctional blocked isocyanate compound containing an isocyanurate ring from a trimer of hexamethylenediisocyanate, which is an aliphatic diisocyanate. However, although this curing agent has the effect of reducing the heating loss, corrosion resistance of the coating film may be reduced.

Japanese examined patent publication Tokko Sho 52-6306, Tokko Sho 55-34238 and Tokkai Hei 4-91170 disclosed use of a multifunctional blocked isocyanate compound containing an aromatic isocyanurate ring as a curing agent. However, although this curing agent also can be expected to have the effect of reducing the heating loss, it often reduces the flatness of the electrodeposition coating film.

BRIEF SUMMARY OF THE INVENTION

The object of this invention is to reduce the heating loss of the coating film while maintaining good general coating film characteristics such as corrosion resistance and flatness.

The curing agent according to this invention is composed of a compound containing an aromatic isocyanurate ring and 3 or more blocked isocyanate groups. Here, at least one of the 3 or more blocked isocyanate groups is blocked with glycol ether.

Also, the curing agent according to this invention is composed of a compound containing an aromatic isocyanurate ring and 3 or more blocked isocyanate groups, and the isocyanate group is blocked with an active hydrogen compound containing an active hydrogen containing compound X represented by the following general formula (1).

$$Ra(OCH_2CHRb)nOH \qquad (1)$$

In this formula,

Ra: Alkyl group with a carbon number of 5–12

Rb: Hydrogen atom or methyl group n: Integer 1–4

Also, the curing agent according to this invention is composed of a compound represented by the following general formula (2).

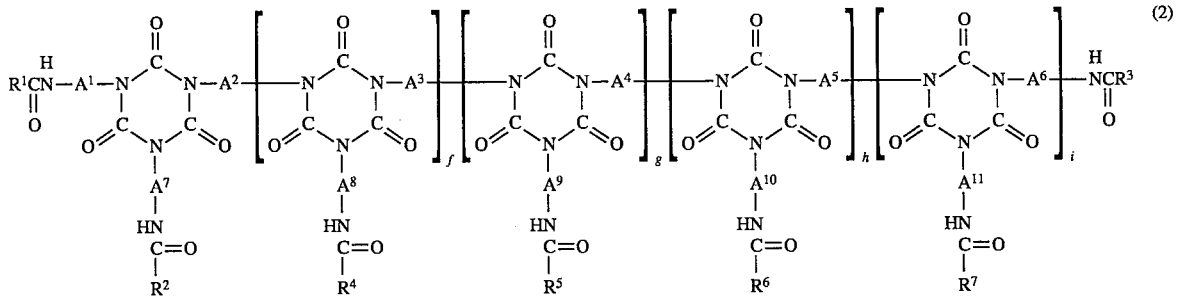

In this formula, each of $A^1$–$A^{11}$ is a structure derived from an aromatic diisocyanate compound chosen from among a group represented by

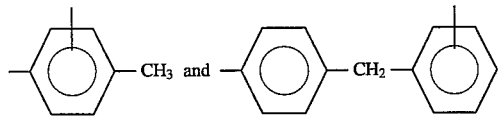

For $R^1$–$R^7$, each of them is a residue obtained by removing active hydrogen from an active hydrogen compound and at least one of them is a residue obtained by removing active hydrogen from glycol ether. Furthermore, f, g, h and i are 0 or 1.

Also, the curing agent according to this invention contains compound I and compound II. Here, compound I contains an aromatic isocyanurate ring and 3 or more isocyanate groups which are all blocked with glycol ether. Compound II contains an aromatic isocyanurate ring and at least 3 isocyanate groups blocked with at least one of active hydrogen compound chosen from among RcOH (Rc denotes a hydrocarbon group with a carbon number of 1–10 which may contain a hydroxyl group), Rd(OCH₂CHRe)mOH (Rd denotes an alkyl group with a carbon number of 1–4, Re denotes a hydrogen atom or a methyl group, and m denotes an integer 1–4), compounds which contain active methylene, oxime compounds, amino alcohol, imidazole and lactam. In this curing agent, at least 20 percent of the total amount (mol) of the blocked isocyanate group contained in said compound I and similarly in said compound II is isocyanate groups blocked with said glycol ether.

The cationic electrodeposition coating composition according to this invention contains a base resin and a curing agent. The curing agent contains a compound containing an aromatic isocyanurate ring and 3 or more blocked isocyanate groups. At least one of the 3 or more blocked isocyanate groups is blocked with glycol ether.

DETAILED DESCRIPTION

The curing agent of this invention contains an aromatic isocyanurate ring. In this specification, an aromatic isocyanurate ring generally stands for a ring structure formed by polymerization of three molecules of aromatic isocyanate. Specifically, it is a ring structure represented by the following formula (3).

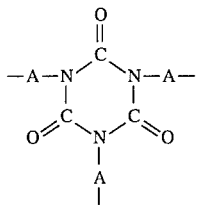

(3)

In this formula, —A— is a residue derived from an aromatic hydrocarbon.

The number of aromatic isocyanurate rings contained in one molecule of curing agent is preferably 1–5, and more preferably 2 or 3. If the number of aromatic isocyanurate rings is 6 or more, then the viscosity of the curing agent becomes high and, when the curing agent of this invention is used in a paint, the workability of coating may decrease.

The curing agent of this invention is a poly-blocked isocyanate compound which contains the aromatic isocyanurate ring as described above. That is, the curing agent of this invention contains a plurality of blocked isocyanate groups as functional groups. Since a standard curing agent has 3 or more functional groups, the number of blocked isocyanate groups contained in the curing agent of this invention is also 3 or more. A blocked isocyanate group means an isocyanate group blocked with an active hydrogen containing compound.

In the curing agent of this invention, at least one of the blocked isocyanate groups is an isocyanate group blocked with glycol ether, which is an active hydrogen compound. In the curing agent of this invention, all of the 3 or more blocked isocyanate groups can be isocyanate groups blocked with glycol ether.

For example, the following general formula (1) preferably represents a compound of a glycol ether described above. This is an example of an active hydrogen containing compound X.

(1)

In this formula, Ra denotes an alkyl group with a carbon number of 5–12 (preferably 6–8), Rb denotes a hydrogen atom or a methyl group, and n is an integer 1–4. If the carbon number of Ra is less than 5, then the flatness of the coating film may be reduced when the curing agent of this invention is used in a paint. On the other hand, if the carbon number of Ra is more than 12, then reduction of the curing ability and an increase in the heating loss may result.

Specific examples of the glycol ether described above are ethylene glycol-type compounds and propylene glycol-type compounds.

Examples of the ethylene glycol-type compounds are ethylene glycol monobutyl ether, ethylene glycol monohexyl ether, ethylene glycol mono-2-ethylhexyl ether, diethylene glycol monobutyl ether, diethylene glycol monohexyl ether and diethylene glycol mono-2-ethylhexyl ether.

Examples of the propylene glycol-type compounds are propylene glycol monobutyl ether, propylene glycol monohexyl ether, propylene glycol mono-2-ethylhexyl ether, dipropylene glycol monobutyl ether, dipropylene glycol monohexyl ether and dipropylene glycol mono-2-ethylhexyl ether.

Of the aforementioned specific examples of the ethylene glycol-type compounds and the propylene glycol-type compounds, particularly preferable are ethylene glycol mono-2-ethylhexyl ether, diethylene glycol mono-2-ethylhexyl ether, propylene glycol mono-2-ethylhexyl ether and dipropylene glycol mono-2-ethylhexyl ether.

In addition to the above described glycol ether to block the isocyanate groups, there can also be used compounds for which Ra is an alkyl group with a carbon number of 1–4, Rb is a hydrogen atom or a methyl group and n is an integer 1–4 in said general formula (1). Specific examples of such glycol ethers are ethylene glycol monomethyl ether, ethylene glycol monoethyl ether, ethylene glycol monobutyl ether, propylene glycol monomethyl ether, diethylene glycol monomethyl ether and diethylene glycol monoethyl ether.

To achieve the reduction in heating loss which is the object of this invention and also achieve the optimum glass transition temperature (described later) of the curing agent itself, Ra, Rb and n should preferably be selected such that the carbon number is 6–15.

Of the blocked isocyanate groups described above, those other than the isocyanate groups blocked with glycol ether can be blocked by standard active hydrogen containing compounds used for blocking of isocyanate groups (excluding glycol ether).

Examples of the standard active hydrogen containing compounds used for the blocking of isocyanate groups excluding glycol ether are alcohols, compounds containing active methylene groups, oxime compounds, amino alcohols, imidazole and lactam.

Examples of the alcohols are represented by the general formula RcOH. Here, Rc denotes a hydrocarbon group with a carbon number of 1–10 which may contain a hydroxyl group, preferably an alkyl group with a carbon number of 4–8. Specific examples of such alcohols are methanol, ethanol, propanol, butanol, amyl alcohol, hexyl alcohol, 2-ethylhexyl alcohol, heptyl alcohol, ocyl alcohol, benzyl alcohol, cyclohexanol, phenol, cresol and xylenol.

Examples of the compounds which contain active methylene are dialkyl esters of acetoacetic acid, malonic acid and cyanoacetic acid. Examples of the oxime compounds are formamidoxime, acetoaldoxime, acetoxime, methylethylketoxime, diacetylmonoxime and cyclohexaneoxime. Examples of the amino alcohols are dimethylethanolamine, dimethylpropanolamine, dimethylisopropanolamine, dimethylbutanolamine, diethylethanolamine, 2-[2-(dimethylamino) ethoxy] ethanol, 2-(2-[2-(dimethylamino) ethoxy) ethanol, 1-[2-(dimehylamino) ethoxy]-2-propanol and 1-(1-[1-(dimethylamino)-2-propoxy]-2-propoxy)-2-propanol. Examples of the lactam are ε-caprolactam, δ-valerolactam, γ-butyrolactam and β-propiolactam. The most preferred lactam is ε-caprolactam.

A particularly preferable curing agent has a structure of the blocked isocyanate group which satisfies the following conditions.

1) At least 20 percent of the total amount (mol) of the blocked isocyanate groups is blocked with glycol ether represented by the general formula (1) described above. If this percentage is less than 20, then the flatness of the coating film may be reduced when the curing agent is used in a paint.

2) In addition to condition (1), the blocked isocyanate groups other than those blocked with glycol ether represented by the general formula (1) described above are isocyanate groups blocked by at least one of active hydrogen containing compound (active hydrogen compound Y) chosen from among alcohols represented by RcOH described above, glycol ethers represented by the general formula $Rd(OCH_2CHRe)mOH$ (Rd denotes an alkyl group with a carbon number of 1–4, Re denotes a hydrogen atom or a methyl group, and m denotes an integer 1–4), active methylene compounds, oxime compounds, amino alcohols, imidazole and lactam.

The glass transition temperature of the curing agent of this invention should preferably be 45° C. or lower. If the glass transition temperature is higher than 45° C., then flowability decreases when the paint which uses this curing agent is heated, and it may be difficult to maintain good flatness of the coating film.

The glass transition temperature described above is influenced by the type and the amount of the aforementioned active hydrogen containing compound which is used to block the isocyanate group, and therefore it can be controlled by adjusting these factors. The glass transition temperature can be determined by using the calibration curve obtained from measurements by a differential thermal analyzer on model compounds. However, eventually it is preferable to determine it by directly measuring the curing agent.

In the curing agent of this invention, the total weight of the blocked part of the isocyanate group preferably accounts for 10–55% of the molecular weight of the compound which composes said curing agent. In this specification, the blocked part stands for a part derived from the active hydrogen containing compound which blocks the isocyanate group, i.e. the remaining part after removing the active hydrogen from the compound used for blocking. If .this ratio is less than 10%, then the flatness of the coating film may be reduced when the curing agent of this invention is used in a paint. On the other hand, if it is more than 55%, then it is difficult to reduce the heating loss.

An example of the curing agent described above is shown below. The structural formula of this curing agent is general formula (2).

In this formula, each of $A^1$–$A^{11}$ is a structure derived from an aromatic diisocyanate compound chosen from among a group represented by

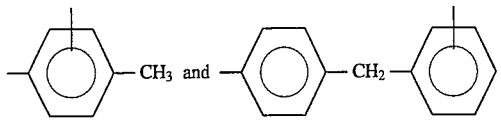

$A^1$–$A^{11}$ can be either the same or different. For $R^1$–$R^7$, each of them is a residue obtained by removing active hydrogen from an active hydrogen containing compound and at least one of them is a residue obtained by removing active hydrogen from glycol ether; and f, g, h and i are 0 or 1.

An example of the glycol ether is the one represented by the general formula (1) described above. It is desirable that at least 20 percent of the total amount (mol) of $R^1$–$R^7$ be a residue obtained by removing the active hydrogen from the glycol ether represented by the general formula (1) as described above. The blocked isocyanate group other than those blocked with the glycol ether represented by the general formula (1) as described above should preferably be an isocyanate group blocked with at least one of active hydrogen containing compound chosen from among the alcohols represented by RcOH described above, glycol ethers represented by the general formula $Rd(OCH_2CHRe)mOH$ described above, active methylene compounds, oxime compounds, amino alcohols, imidazole and lactam.

Similarly, for the curing agent represented by the aforementioned general formula (2), the preferable range of the glass transition temperature is 45° C. or less, and the total weight of the blocked part of the isocyanate group, i.e. $R^1$–$R^7$, preferably accounts for 10–55% of the molecular weight of the compound represented by the aforementioned general formula (2).

The curing agent of this invention can also be a mixture of the following compounds I and II.

Compound I: A compound which contains an aromatic isocyanurate ring and 3 or more blocked isocyanurate rings. All of the blocked isocyanate groups are blocked with glycol ether.

Compound II: A compound which contains an aromatic isocyanurate ring and at least 3 isocyanate groups blocked with at least one of active hydrogen containing compound chosen from among RcOH (Rc denotes a hydrocarbon group with a carbon number of 1–10 which may contain a hydroxyl group), $Rd(OCH_2CHRe)mOH$ (Rd denotes an alkyl group with a carbon number of 1–4, Re denotes a hydrogen atom or a methyl group, and m denotes an integer 1–4), com-

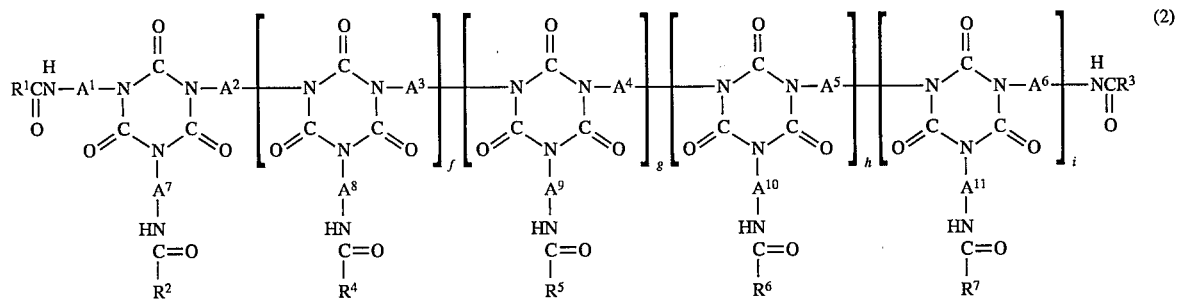

pounds which contain active methylene, oxime compounds, amino alcohols, imidazole and lactam.

In this curing agent, however, at least 20 percent of the total amount (mol) of the blocked isocyanate group contained in said compound I and similarly in said compound II must be isocyanate groups blocked with said glycol ether. If the ratio is less than 20 percent, then the flatness of the coating film may be reduced when this curing agent is used in a paint.

The glass transition temperature is preferably 45° C. or lower for this curing agent, so as not to reduce the flatness of the coating film. In view of the need for maintaining flatness of the coating film and reducing the heating loss, the total weight of the blocked part of the isocyanate group contained in compound I and compound II should preferably be 10–55% of the average molecular weight of said compound I and said compound II.

Method of Preparing the Curing Agent

An example of the method of preparing the curing agent of this invention is described below.

In general, the curing agent of this invention is obtained by using an active hydrogen containing compound to block a polyisocyanate compound obtained by trimerization of an aromatic diisocyanate compound.

Examples of the aromatic isocyanate compound include tolylenediisocyanate and phenylenediisocyanate.

An example of the polyisocyanate compound used in this preparation method is represented by the following general formula (4).

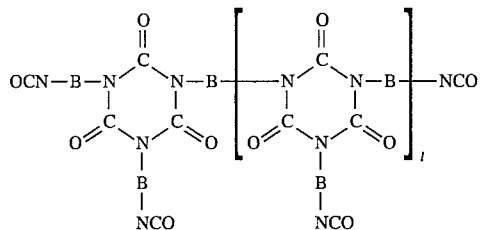

In the above formula, B denotes

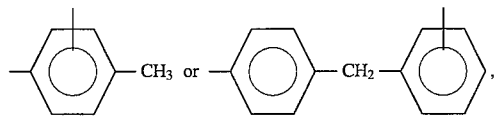

In the above formula, 1 is 0–4, preferably 1–2.

The polyisocyanate compound described above can contain monomer components which are residual untrimerized monomers, i.e. aromatic isocyanate compounds such as tolylenediisocyanate and phenylenediisocyanate. However, if the ratio of the residual monomers in the polyisocyanate compound exceeds 50 wt%, then it may not be possible to obtain a curing agent which can achieve the objects of this invention.

In order to block the polyisocyanate compound described above, an active hydrogen continuing compound is reacted with the polyisocyanate compound described above. When using 2 or more types of active hydrogen continuing compounds, compounds can be added to and reacted with the polyisocyanate compound simultaneously, or one after the other. However, when using 2 or more types of active hydrogen containing compounds with different reactivities, it is preferable to react with the polyisocyanate compound the active hydrogen containing compound having a higher reactivity, and then react the active hydrogen containing compound having a lower reactivity.

The preferable glass transition temperature of the curing agent and the preferable ratio of the blocked part can be achieved by selecting the type of the active hydrogen containing compound and adjusting the amount of the active hydrogen containing compound.

When the curing agent contains the aforementioned compounds I and II, this curing agent can be obtained by mixing compound I and compound II, each of which is obtained by the process described above.

Use of the Curing Agent

The curing agent of this invention can be used, for example, as a curing agent for a paint or a curing agent for a resin molding material. When used as a curing agent for a paint, the type of the paint is not limited, but it is particularly effective when used for a cationic electrodeposition paint.

Cationic Electrodeposition Paint

The cationic electrodeposition paint of this invention is described next. The cationic electrodeposition paint of this invention generally contains a base resin, a curing agent, a pigment, a resin for dispersing the pigment and solvent.

For the base resin, a resin with a number average molecular weight of 400–10,000, preferably 1,000–3,000, derived from bisphenol-type epoxy resins can be used. The base equivalent of the base resin can be in the normal range, specifically 40–150 (milli-equivalent/100 g), preferably 60–100 (milli-equivalent/100 g). The glass transition temperature of the base resin is preferably 40° C. or lower, more preferably 35° C. or lower. A resin with a glass transition temperature of 40° C. or higher has insufficient flowability when heated, and may reduce the flatness of the coating film.

Specific examples of the base resin are widely known in the industry including a compound obtained by a reaction between glycidyl ether of polyphenol and half-blocked diisocyanate followed by a ring opening reaction of the epoxy group using an amine compound. The most preferable for the base resin is a modified epoxy resin which contains an oxazolidone ring in the molecule. This modified epoxy resin can be obtained by a reaction between an epoxy resin and a bis- or hetero-urethane compound derived from a diisocyanate compound.

For the curing agent, those described above according to this invention are used. The amount of this curing agent to be added is preferably determined according to the ratio of the curing agent and the base resin. Normally, the weight ratio of the base resin (A) and the curing agent (B) is set at 90/10–50/50. If the ratio of the curing agent is less than 10, then a sufficient curing ability cannot be obtained. On the other hand, if it is over 50, then the heating loss may increase.

The range of the solubility parameter (SP) of the curing agent should preferably be 9.5–11.5 for better miscibility with the base resin. If SP is outside of this range, then stability of a mixture containing the base resin and the curing agent may not be insufficient. The solubility parameter (SP) is determined according to the following equation (1) given by K. W. Suh and J. M. Corbett in Journal of Applied Polymer Science, 12, 2359 (1968).

$$SP=(V_{ml}^{1/2}\cdot\delta_{ml}+V_{mh}^{1/2}\cdot\delta_{mh})/(V_{mh}^{1/2}+V_{ml}^{1/2}) \quad (1)$$

In this equation, Vml is the volume of the low-SP solvent at the cloud point, Vmh is the volume of the high-SP solvent at the cloud point, δml is the solubility parameter of the low-SP solvent, and δmh is the solubility parameter of the high-SP solvent.

For the pigment, the resin for dispersing the pigment and the solvent, those commonly used for cationic electrodeposition paints are used.

By using the cationic electrodeposition paint of this invention, it is possible to reduce the heating loss of the coating film while maintaining good general coating film characteristics, such as corrosion resistance and flatness.

EXAMPLE

Synthesis Example 1

Synthesis of Base Resin I Containing an Oxazolidone Ring

A flask with a stirrer, a cooler, a nitrogen injection tube, a thermometer and a dripping funnel was used. 285.0 g of oxazolidonated epoxy resin (epoxy-equivalent=475, oxazolidone ring equivalent=650) derived from bisphenol A, epichlorohydrine and 2,4-/2,6-tolylenediisocyanate (weight ratio=8:2), 380.0 g of epoxy resin with an epoxy-equivalent of 950, 77.0 g of p-nonylphenol and 82.4 g of methylisobutylketone were put into this flask and the temperature was raised to homogenize them. 3.0 g of benzyldimethylamine was added to this and the reaction was conducted at 130° C. until an epoxy-equivalent of 1140 was reached. The mixture was then cooled, and 19.2 g of diethanolamine, 27.0 g of N-methylethanolamine and 30.6 g of ketiminated aminoethylethanolamine (79 wt% in a methylisobutylketone solution) were added, followed by a 2-hour reaction at 110° C. The mixture was then diluted with methylisobutylketone until the non-volatile content was 90% to obtain base resin I.

Synthesis Example 2

Synthesis of Base Resin II With No Oxazolidone Ring

A flask with a stirrer, a cooler, a nitrogen injection tube, a thermometer and a dripping funnel was used. 92 g of 2,4-/2,6-tolylenediisocyanate (weight ratio=8:2), 95 g of methylisobutylketone and 0.5 g of dibutyltindilaurate were put into this flask and 21 g of methanol was dripped into the mixture as it was stirred. The reaction started at room temperature and the temperature rose to 60° C. due to heat generation. The reaction was then continued for 30 minutes and 57 g of ethylene glycol mono-2-ethylhexyl ether was dripped through the dripping funnel, followed by the addition of 42 g of bisphenol A-propyleneoxide 5 mol adduct. The reaction was conducted mainly in the temperature range of 60°–65° C., and continued while the IR spectrum was monitored until the absorption spectrum of the NCO group disappeared.

Then 365 g of epoxy resin with an epoxy-equivalent of 188 synthesized from bisphenol A and epichlorohydrine was added and the reaction was conducted at 130° C. until the epoxy-equivalent reached 410. 87 g of bisphenol A was then added and the reaction was conducted at 120° C. to have an epoxy-equivalent of 1190. The mixture was then cooled, and 11 g of diethanolamine, 24.0 g of N-methylethanolamine and 25 g of ketiminated aminoethylethanolamine were added, followed by a 2-hour reaction at 110° C. The mixture was then diluted with methylisobutylketone until the non-volatile content was 80% to obtain base resin II.

Synthesis Example 3

Preparation of the Pigment-Dispersing Paste

Bisphenol-type epoxy resin with an epoxy-equivalent of 450 was reacted with 2-ethylhexanol half-blocked isophoronediisocyanate and the product was treated with tertialization of sulfide by using 1-(2-hydroxyethylthio)-2-propanol and dimethylolpropionic acid to obtain a resin varnish (with a ratio of tertialization of sulfide of 70.6% and a resin solid content of 60%) for dispersing pigments. 125.0 g of this resin varnish, 400.0 g of ion-exchanged water, 8.5 g of carbon black, 72.0 g of kaolin, 345.0 g of titanium oxide and 75.0 g of aluminum phosphomolybdate were dispersed using a sand grind mill, and the mixture was further grinded to have a particle size of 10 micrometers or less to obtain a pigment paste.

Example 1

Synthesis of Curing Agent A Containing an Aromatic Isocyanurate Ring

A flask with a stirrer, a cooler, a nitrogen injection tube, a thermometer and a dripping funnel was used. A methylisobutylketone solution of diphenylmethanediisocyanate trimer (as a polyisocyanate compound; product name "MC-708S" from Nippon Polyurethane Industry Co., Ltd.: NCO equivalent=230, solid content=60%, residual monomer content=20%), the amount of which was 230 g as solid, and 22.8 g of ε-caprolactam, as active hydrogen containing compound Y, were put into this flask. The contents of the flask were then heated up to 80° C. to dissolve them homogeneously. A homogeneously dissolved mixture of 14 g of ethylene glycol monohexyl ether, as active hydrogen containing compound X, 0.183 g of dibutyltindilaurate and 0.183 g of 1,8-diazabicyclo (5,4,0)-7-undecene was dripped while special attention was given to heat generation. After the dripping was completed, the temperature of the flask was kept at 80° C. and the reaction was continued until the NCO equivalent reached 380. 100 g of ethylene glycol monohexyl ether, as active hydrogen containing compound X, was then dripped through the dripping funnel over one hour. The reaction was continued until the absorption from the NCO group disappeared in the infrared (IR) absorption spectrum to obtain curing agent A. This curing agent had a non-volatile content of 70.2%.

The obtained curing agent A was dried at 105° C., and the glass transition temperature of the solid after removing the solvent was 31° C., as measured with a temperature rising rate of 10° C./min by using a thermal analyzer "model DSC-5200" manufactured by Seiko Electronics Industries Co., Ltd.

Examples 2–10

Synthesis of Curing Agents B–J Containing an Aromatic Isocyanurate Ring

The raw materials, i.e. polyisocyanate compounds, active hydrogen containing compound X and active hydrogen containing compound Y were changed according to Table 1, and the same procedures as for Example 1 were followed to obtain curing agents B–J.

TABLE 1

| Curing agent | | | Examples | | | | |
|---|---|---|---|---|---|---|---|
| | | | 1<br>A | 2<br>B | 3<br>C | 4<br>D | 5<br>E |
| Composition (weight parts) | Polyisocyannate compound | MC - 708S *1 | 230 | — | 230 | 230 | 230 |
| | | MC - 707 *2 | — | 230 | — | — | — |
| | | C - 2030MB *3 | — | — | — | — | — |
| | Active hydrogen compound X | Ethylene glycol monohexyl ether | 114<br>(0.8) | — | — | 114<br>(0.8) | 114<br>(0.8) |
| | | Ethylene glycol mono-2-ethylhexyl ether | — | 87<br>(0.5) | — | — | — |
| | | Diethylene glycol mono-2-ethylhexyl ether | — | — | 65<br>(0.3) | — | — |
| | | Dipropylene glycol monobutyl ether | — | — | — | — | — |
| | Active hydrogen compound Y | ε-caprolactam | 23<br>(0.2) | 57<br>(0.5) | 80<br>(0.7) | — | — |
| | | Propylene glycol | — | — | — | 12<br>(0.2) | — |
| | | Methylethylketoxime | — | — | — | — | 17<br>(0.2) |
| Characteristics | Non-volatile content (%) | | 70.2 | 70.3 | 69.8 | 70.4 | 69.0 |
| | Glass transition temperature (°C.) | | 31 | 28 | 23 | 5 | 10 |

| Curing agent | | | Examples | | | | |
|---|---|---|---|---|---|---|---|
| | | | 6<br>F | 7<br>G | 8<br>H | 9<br>I | 10<br>J |
| Composition (weight parts) | Polyisocyannate compound | MC - 708S *1 | — | — | 230 | 230 | 230 |
| | | MC - 707 *2 | — | — | — | — | — |
| | | C - 2030MB *3 | 247 | 247 | — | — | — |
| | Active hydrogen compound X | Ethylene glycol monohexyl ether | 85<br>(0.6) | 142<br>(1.0) | 14<br>(0.1) | — | — |
| | | Ethylene glycol mono-2-ethylhexyl ether | — | — | — | — | — |
| | | Diethylene glycol mono-2-ethylhexyl ether | — | — | — | 218<br>(1.0) | — |
| | | Dipropylene glycol monobutyl ether | 38<br>(0.2) | — | — | — | — |
| | Active hydrogen compound Y | ε-caprolactam | — | — | 104<br>(0.9) | — | 114<br>(1.0) |
| | | Propylene glycol | — | — | — | — | — |
| | | Methylethylketoxime | 17<br>(0.2) | — | — | — | — |
| Characteristics | Non-volatile content (%) | | 60.2 | 60.4 | 69.8 | 70.2 | 69.0 |
| | Glass transition temperature (°C.) | | 20 | 13 | 40 | 2 | 45 |

In Table 1:
*1: Diphenylmethanediisocyanate trimer (from Nippon Polyurethane Industry Co., Ltd.: NCO equivalent = 230, solid content = 60%, residual monomer content = 20%)
*2: Diphenylmethanediisocyanate trimer (from Nippon Polyurethane Industry Co., Ltd.: NCO equivalent = 230, solid content = 60%, residual monomer content = 15%)
*3: Tolylenediisocyanate trimer (from Nippon Polyurethane Industry Co., Ltd.: NCO equivalent = 247, solid content = 60%, residual monomer content = 0.6%)
*4: Shown in the parentheses are the equivalent ratios calculated by assuming the isocyanate equivalent in the polyisocyanate compound is 1.

Comparative Example 1

Synthesis of Curing Agent A Containing an Aliphatic Isocyanurate Ring

A flask with a stirrer, a cooler, a nitrogen injection tube, a thermometer and a dripping funnel was used. 199 g of hexamethylenediisocyanate trimer (as a polyisocyanate compound; product name "Colonate HX" from Nippon Polyurethane Industry Co., Ltd.), 32 g of methylisobutylketone and 0.05 g of dibutyltinlaurate were put into this flask. 87.0 g of methylketoxime was then dripped through the dripping funnel over one hour, while stirring and nitrogen blowing were conducted. The reaction was continued until the absorption from the NCO group disappeared in the infrared (IR) absorption spectrum to obtain comparative curing agent a.

The glass transition temperature of this comparative curing agent a was −14° C., as measured in the same manner as for Example 1.

Comparative Example 2

Synthesis of Diisocyanate-Type Curing Agent B

A flask with a stirrer, a cooler, a nitrogen injection tube, a thermometer and a dripping funnel was used. 174 g of tolylenediisocyanate (product "Colonate T-80" from Nippon Polyurethane Industry Co., Ltd.: NCO equivalent=87), 45 g of ε-caprolactam and 112 g of methylisobutylketone were put into this flask. A homogeneously dissolved mixture of 28 g of ethylene glycol monohexyl ether, 0.35 g of dibutyltindilaurate and 0.35 g of 1,8-diazabicyclo(5,4,0)-7-undecene was then dripped while special attention was given to heat generation. After the dripping was completed, the temperature of the flask was kept at 60° C. and 170 g of ethylene glycol monohexylether was then dripped over one hour. 70 g of trimethylolpropane was then added. The reaction was continued until the absorption from the NCO group disappeared in the IR spectrum. Methylisobutylketone was then added until the non-volatile content was 70% to obtain comparative curing agent b (non-volatile content=70.4%). Comparative curing agent b had a glass transition temperature of 10° C.

Comparative Example 3

Synthesis of Curing Agent C Containing an Aromatic Isocyanurate Ring Without the Block Part Composed of Glycol Ether A flask with a stirrer, a cooler, a nitrogen injection tube, a thermometer and a dripping funnel was used. A methylisobutylketone solution of diphenylmethanediisocyanate trimer (as a polyisocyanate compound; product name "MC-708S" from Nippon Polyurethane Industry Co., Ltd.: NCO equivalent=230, solid content=60%, residual monomer content=20%), the amount of which was 230 g as solid, and 0.183 g of dibutyltindilaurate were put into this flask. 87 g of n-butanol was then dripped while special attention was given to heat generation. After the dripping was completed, the temperature of the flask was kept at 80° C. and the reaction was continued until the absorption from the NCO group disappeared in the IR spectrum to obtain comparative curing agent c. This comparative curing agent c had a non-volatile content of 69.8% and a glass transition temperature of 43° C.

Examples 11–24, Comparative Examples 4–6

Preparation of the Cationic Electrodeposition Paints

The base resins I and II obtained in Synthesis examples 1 and 2, curing agents A–J obtained in Examples 1–10 and comparative curing agents a–c obtained in Comparative Examples 1–3 were mixed according to the ratios shown in Table 2, and ethylene glycol mono-2-ethylhexyl ether was added, the amount of which was 3% of the solid. Glacial acetic acid was then added so that the ratio of the neutralization became 40.5%. Ion-exchanged water was then added to gradually dilute the mixture. Under reduced pressure, methylisobutylketone was removed until the solid content reached 36.0%. 2000.0 g of the main emulsion thus obtained, 460.0 g of the pigment paste obtained in Synthesis example 3, 2252.0 g of ion-exchanged water and a surface control agent/curing catalyst (dibutyltinoxide, 1 wt% of the solid) were mixed to obtain a cationic electrodeposition paint with a solid content of 20.0%.

Using the obtained cationic electrodeposition paints, electrodeposition coating was conducted on a cold-rolled steel sheet treated with zinc phosphate to have a dry film thickness of 20 micrometers. 20 minutes of baking was then conducted at 165° C. to obtain a cured film. The evaluation of the obtained film is shown in Table 2. The evaluation method is described below.

Heating Loss

This was determined as the reduction ratio by weight (%) of the coating film after 3 hours of heated drying at 105° C. and 20 minutes of baking at 220° C. The tolerance of the reduction ratio by weight is less than 15%.

Flatness of the Coating Film

Evaluated by visual observation. The evaluation standard is shown below.

⊙: Very good

○: Good

Δ: Rough surface

×: Very rough surface

Salt Water Spray Test

Evaluation was conducted according to JIS-Z2371. A knife was used to make a cross-cut on a coated film obtained by conducting electrodeposition on a untreated cold-rolled sheet. Salt water was then sprayed at 35° C. for 480 hours, followed by evaluation of the peeled width of the edge, the peeled width with tape peeling, the rust width from the edge and the number of blisters.

○: Good

Δ: Fair

×: Bad

Yellowing of Topcoating

An electrodeposition coating film (160° C.×10 minutes and 180° C.×20 minutes) was prepared. A light-colored top coat was sprayed on this and baking was conducted at 140° C. for 20 minutes. The color difference was then evaluated by visual observation.

○: No yellowing

×: Remarkable yellowing

TABLE 2

| | | | Examples | | | | | | | | |
| --- | --- | --- | --- | --- | --- | --- | --- | --- | --- | --- | --- |
| | | | 11 | 12 | 13 | 14 | 15 | 16 | 17 | 18 | 19 |
| Composition (weight parts) | Base resin | I | 70 | 70 | 70 | — | — | — | — | 80 | 60 |
| | | II | — | — | — | 70 | 70 | 70 | 70 | — | — |
| | Curing agents | A | 30 | — | — | — | — | — | — | 20 | 40 |
| | | B | — | 30 | — | — | — | — | — | — | — |
| | | C | — | — | 30 | — | — | — | — | — | — |
| | | D | — | — | — | 30 | — | — | — | — | — |
| | | E | — | — | — | — | 30 | — | — | — | — |
| | | F | — | — | — | — | — | 30 | — | — | — |
| | | G | — | — | — | — | — | — | 30 | — | — |
| | | H | — | — | — | — | — | — | — | — | — |
| | | I | — | — | — | — | — | — | — | — | — |
| | | J | — | — | — | — | — | — | — | — | — |

TABLE 2-continued

|  |  |  |  |  |  |  |  |  |  |  |
|---|---|---|---|---|---|---|---|---|---|---|
|  | a | — | — | — | — | — | — | — | — | — |
|  | b | — | — | — | — | — | — | — | — | — |
|  | c | — | — | — | — | — | — | — | — | — |
| Coating film evaluation results | Heating loss (%) | 11.0 | 10.0 | 10.2 | 9.2 | 9.6 | 9.0 | 10.1 | 6.9 | 13.5 |
|  | Flatness of the coating film | ⊙ | ⊙ | ⊙ | ⊙ | ⊙ | ⊙ | ⊙ | ⊙ | ⊙ |
|  | Salt spray test | ○ | ○ | ○ | ○ | ○ | ○ | ○ | ○ | ○ |
|  | Yellowing of the overcoating | ○ | ○ | ○ | ○ | ○ | ○ | ○ | ○ | ○ |

|  |  |  | Examples |  |  |  |  | Comparative Examples |  |  |
|---|---|---|---|---|---|---|---|---|---|---|
|  |  |  | 20 | 21 | 22 | 23 | 24 | 4 | 5 | 6 |
| Composition (weight parts) | Base resin | I | 68 | — | — | — | — | 68 | 68 | 68 |
|  |  | II | — | 70 | 70 | 70 | 70 | — | — | — |
|  | Curing agents | A | — | — | — | — | — | — | — | — |
|  |  | B | — | — | — | — | — | — | — | — |
|  |  | C | — | — | — | — | — | — | — | — |
|  |  | D | — | — | — | — | — | — | — | — |
|  |  | E | — | — | — | — | — | — | — | — |
|  |  | F | — | — | — | — | — | — | — | — |
|  |  | G | — | 20 | 15 | — | — | — | — | — |
|  |  | H | 32 | — | — | — | — | — | — | — |
|  |  | I | — | — | — | 10 | 15 | — | — | — |
|  |  | J | — | 10 | 15 | 20 | 15 | — | — | — |
|  |  | a | — | — | — | — | — | 32 | — | — |
|  |  | b | — | — | — | — | — | — | 32 | — |
|  |  | c | — | — | — | — | — | — | — | 32 |
| Coating film evaluation results | Heating loss (%) | | 10.3 | 10.5 | 9.90 | 10.2 | 11.0 | 10.2 | 20.6 | 10.1 |
|  | Flatness of the coating film | | ○ | ⊙ | ⊙ | ⊙ | ⊙ | ○ | Δ | X |
|  | Salt spray test | | ○ | ○ | ○ | ○ | ○ | X | ○ | X |
|  | Yellowing of the overcoating | | ○ | ○ | ○ | ○ | ○ | ○ | X | ○ |

We claim:

1. A cationic electrodeposition coating composition containing a base resin and a curing agent represented by the following general formula (2):

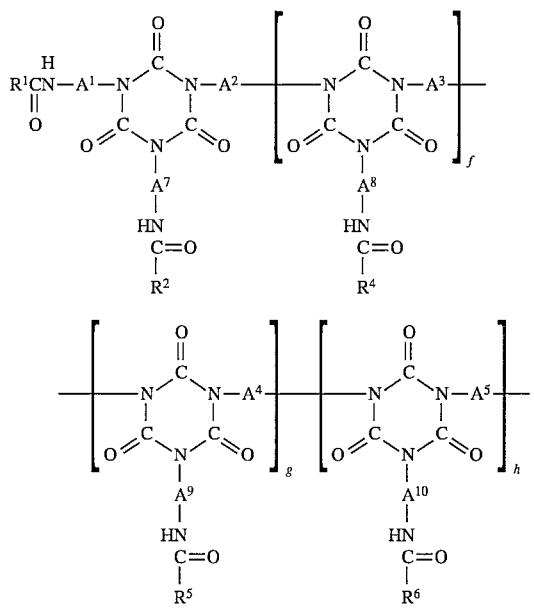

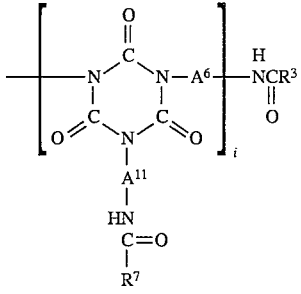

wherein each of $A^1$–$A^{11}$ is a structure derived from an aromatic diisocyanate compound chosen from among a group represented by

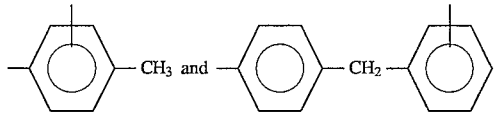

each of $R^1$–$R^7$ is a residue obtained by removing active hydrogen from an active hydrogen containing compound and at least one of which is a residue obtained by removing active hydrogen from glycol ether; and f, g, h and i are 0 or 1, said glycol ether being represented by the following general formula (1)

$$Ra(OCH_2CHRb)nOH \quad (1)$$

wherein

Ra: Alkyl group with a carbon number of 5–12

Rb: Hydrogen atom or methyl group n: Integer 1–4, at least twenty percent of the total amount (mol) of said $R^1$–$R^7$ is residues obtained by removing active hydrogen from glycol ether represented by said general formula (1), the group of residues comprising said $R^1$–$R^7$ containing not only residues derived from glycol ether represented by said general formula (1) but also residues obtained by removing active hydrogen from at least one type of active hydrogen containing compound chosen from among RcOH (Rc denotes a hydrocarbon group with a carbon number of 1–10 which may contain a hydroxyl group), Rd(OCH$_2$CHRe)mOH (Rd denotes an alkyl group with a carbon number of 1–4, Re denotes a hydrogen atom or a methyl group, and m denotes an integer 1–4), compounds which contain active methylene, oxime compounds, amino alcohols, imidazole and lactam.

2. The cationic electrodeposition coating composition containing a curing agent as described in claim 1, which has a glass transition temperature of 45° C. or lower.

3. The cationic electrodeposition coating composition containing a curing agent as described in claim 2, for which the total weight of said $R^1$–$R^7$ accounts for 10–55% of the molecular weight of the compound represented by said general formula (2).

4. A cationic electrodeposition coating composition comprising a base resin and a curing agent, said curing agent containing compound I containing an aromatic isocyanurate ring and three or more isocyanate groups all of which are blocked with glycol ether, as well as compound II containing an aromatic isocyanurate ring and at least three isocyanate groups blocked with at least one type of active hydrogen containing compound chosen from among RcOCH (Rc denotes a hydrocarbon group with a carbon number of 1–10 which may contain a hydroxyl group), Rd(OCH$_2$CHRe)mOH (Rd denotes an alkyl group with a carbon number of 1–4, Re denotes a hydrogen atom or a methyl group, and m denotes an integer 1–4), compounds which contain active methylene, oxime compounds, amino alcohol, imidazole and lactam and wherein at least twenty percent of the total amount (mol) of the blocked isocyanate groups contained in said compound I and in said compound II are isocyanate groups blocked with said glycol ether.

5. The cationic electrodeposition coating composition of claim 4, wherein said curing agent has a glass transition temperature of 45° C. or lower.

6. The cationic electrodeposition coating composition of claim 5, wherein the total weight of the part blocking said isocyanate group accounts for 10–55% of the average molecular weight of said compounds I and II.

7. A cationic electrodeposition coating composition comprising a base resin and a curing agent, said curing agent containing a compound containing an aromatic isocyanurate ring and 3 or more blocked isocyanate groups wherein at least one of said blocked isocyanate groups is blocked with glycol ether, and wherein the weight ratio between said base resin and said curing agent is 90/10-50-50.

8. The cationic electrodeposition coating composition of claim 7, wherein said base resin comprises modified epoxy resin containing an oxazolidone ring.

* * * * *